(12) United States Patent
Yan et al.

(10) Patent No.: US 10,594,802 B1
(45) Date of Patent: Mar. 17, 2020

(54) SYSTEM AND METHOD FOR SHARING STATEFUL INFORMATION

(71) Applicant: Dell Software Inc., Aliso Viejo, CA (US)

(72) Inventors: Xilang Yan, Zhuhai (CN); Yinghua Qin, Zhuhai (CN)

(73) Assignee: QUEST SOFTWARE INC., Aliso Viejo, CA (US)

( * ) Notice: Subject to any disclaimer, the term of this patent is extended or adjusted under 35 U.S.C. 154(b) by 1002 days.

(21) Appl. No.: 14/248,215

(22) Filed: Apr. 8, 2014

(51) Int. Cl.
*H04L 29/08* (2006.01)

(52) U.S. Cl.
CPC ............ *H04L 67/142* (2013.01); *H04L 67/02* (2013.01)

(58) Field of Classification Search
CPC ....................................................... H04L 67/02
See application file for complete search history.

(56) References Cited

U.S. PATENT DOCUMENTS

| | | | | |
|---|---|---|---|---|
| 7,409,420 B2* | 8/2008 | Pullara | ................ | G06F 11/2035 370/352 |
| 8,302,169 B1* | 10/2012 | Presotto | ................ | G06F 21/602 713/155 |
| 8,392,563 B1 | 3/2013 | Masters | | |
| 9,667,711 B2* | 5/2017 | Guerin | ................ | H04L 67/1008 |
| 2002/0004784 A1* | 1/2002 | Forbes | ................... | G06F 21/606 705/51 |
| 2011/0307619 A1* | 12/2011 | Ogura | ..................... | H04L 51/14 709/228 |
| 2012/0089849 A1* | 4/2012 | Tsai | .................... | G06F 21/6263 713/189 |
| 2013/0031403 A1 | 1/2013 | Mordani et al. | | |
| 2013/0054822 A1* | 2/2013 | Mordani | ............. | H04L 67/1034 709/228 |
| 2013/0246563 A1* | 9/2013 | Cardozo | ........... | G06F 17/30876 709/217 |

OTHER PUBLICATIONS

Oracle, "Developing Web Applications, Servlets, and JSPs for Oracle WebLogic Server: Using Sessions and Session Persistence," http://docs.oracle.com, 2013, 14 pages.
"Load balancing (computing)," Wikipedia, downloaded Jul. 3, 2013, 7 pages.

* cited by examiner

*Primary Examiner* — Moustafa M Meky
*Assistant Examiner* — Sm Z Islam
(74) *Attorney, Agent, or Firm* — Winstead PC

(57) ABSTRACT

In one embodiment, a method includes receiving a HTTP request from a client device, the HTTP request initiating a user session. The method further includes dispatching the HTTP request to a selected application server of a set of application servers. In addition, the method includes servicing the request. Moreover, the method includes storing stateful information as at least one object in a central object store, wherein each of the at least one object is accessible via a lookup key. Also, the method includes generating a cookie. Further, the method includes encrypting into the cookie each lookup key for the at least one object. In addition, the method includes transmitting a response to the client device, the response comprising the cookie.

17 Claims, 3 Drawing Sheets

SYSTEM AND METHOD FOR SHARING STATEFUL INFORMATION

BACKGROUND

Technical Field

The present invention relates generally to data storage and more particularly, but not by way of limitation, to systems and methods for sharing stateful information.

History of Related Art

Because hypertext transfer protocol (HTTP) is a stateless protocol, there are many reasons to store a session state for HTTP session tracking. However, storing session state on a server side of a web application can be a barrier to scalability. For example, if a subsequent request is dispatched to a different server instance than the one with which the session began, session state is generally lost. Therefore, if session state is to be maintained, all requests resulting from a given session are generally dispatched to a same server instance. This can make load balancing difficult and ineffective.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a computer system comprising at least one server computer, receiving a HTTP request from a client device, the HTTP request initiating a user session. The method further includes dispatching the HTTP request to a selected application server of a set of application servers. In addition, the method includes servicing the request. Moreover, the method includes storing stateful information as at least one object in a central object store, wherein each of the at least one object is accessible via a lookup key. Also, the method includes generating a cookie. Further, the method includes encrypting into the cookie each lookup key for the at least one object. In addition, the method includes transmitting a response to the client device, the response comprising the cookie.

In one embodiment, an information handling system includes a processing unit. The processing unit is operable to implement a method. The method includes receiving a HTTP request from a client device, the HTTP request initiating a user session. The method further includes dispatching the HTTP request to a selected application server of a set of application servers. In addition, the method includes servicing the request. Moreover, the method includes storing stateful information as at least one object in a central object store, wherein each of the at least one object is accessible via a lookup key. Also, the method includes generating a cookie. Further, the method includes encrypting into the cookie each lookup key for the at least one object. In addition, the method includes transmitting a response to the client device, the response comprising the cookie.

In one embodiment, a computer-program product includes a non-transitory computer-usable medium having computer-readable program code embodied therein. The computer-readable program code is adapted to be executed to implement a method. The method includes receiving a HTTP request from a client device, the HTTP request initiating a user session. The method further includes dispatching the HTTP request to a selected application server of a set of application servers. In addition, the method includes servicing the request. Moreover, the method includes storing stateful information as at least one object in a central object store, wherein each of the at least one object is accessible via a lookup key. Also, the method includes generating a cookie. Further, the method includes encrypting into the cookie each lookup key for the at least one object. In addition, the method includes transmitting a response to the client device, the response comprising the cookie.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
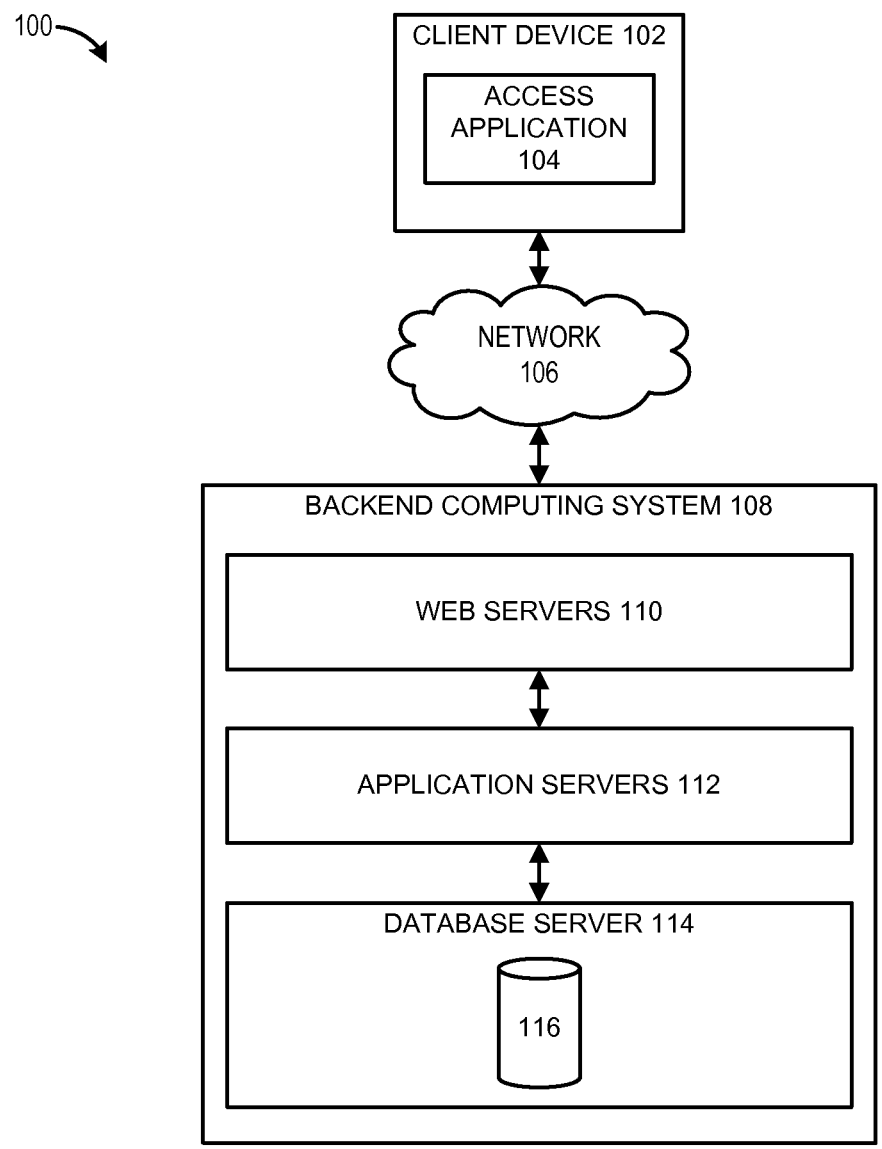
FIG. 1 illustrates an example of a system for sharing stateful information.

In various embodiments, objectives of session-state persistence and load-balancing can be better achieved utilizing systems and methods described herein. In a typical embodiment, stateful information for user sessions can be stored as objects in a central object store and shared across a pool of application servers. The objects of the central object store can be made accessible, for example, by lookup key. In a typical embodiment, a backend computing system can encrypt into a cookie a lookup key for each object that is applicable to a given user's session. The cookie can be provided to a client device, for example, in a response to an initial request that begins a user session.

In a typical embodiment, the cookie is included in subsequent requests from the client device during the user session. In general, each lookup key can be retrieved from such subsequent requests and used to locate and access stateful information pertaining to the user session. In a typical embodiment, this enables all requests from client devices, whether initial requests or subsequent requests, to be dispatched to any application server of the pool of application servers. Consequently, in a typical embodiment, load-balancing routines can be used to advantageously vary how requests are dispatched to application servers without any concern of losing access to stateful information.

For purposes of this patent application, a user session refers to an interactive information interchange between a computer and a user. The user session can be established at a certain point in time and torn down at a later point in time if, for example, a certain period of time expires. Stateful information, as used herein, refers to stored information about previous user activity such as, for example, a user's previous activity during a given user session. A lookup key, as used herein, uniquely identifies data such as, for example, objects encapsulating stateful information. In various embodiments, a lookup key can be a sequence number, a hash key, an internet protocol (IP) address, media access control (MAC) address, domain name system (DNS) name, a combination of any of the foregoing and/or other information that can be used, at a given point in time, to uniquely identify data.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example of a system 100 for sharing stateful information. The system 100 includes a client device 102 and a backend computing system 108. The client device 102 and the backend computing system 108 are operable to communicate over a network 106 such as, for example, the Internet, a corporate intranet or extranet, and/or the like.

As shown, the client device 102 is an information handling system that is operable to execute an access application 104. In a typical embodiment, the access application 104 is representative of any software application that can be used to facilitate locating and/or contacting of the backend computing system 108. For example, in some embodiments, the access application 104 can be a platform-specific native application such as a web-browser application. For purposes of simplicity, only a single client device (i.e., the client device 102) is illustrated in FIG. 1. However, it should be appreciated that the client device 102 can be representative of any number of similar client devices.

The backend computing system 108 includes web servers 110, application servers 112, and a database server 114. In a typical embodiment, the web servers 110, the application servers 112, and the database server 114 are operable to inter-communicate, for example, over the network 106, another network that is internal to the backend computing system 108, and/or the like. In various embodiments, the web servers 110, the application servers 112, and the database server 114 can collaborate to execute, for example, a distributed web application. The web servers 110, the application servers 112, and the database server 114 can each be representative of one or more physical and/or virtual server computers.

In general, the web servers 110 are information handling systems that are operable to communicate with the client device 102 over the network 106, for example, via the access application 104. The application servers 112 typically execute programs, routines, and scripts for supporting one or more web applications. In various embodiments, the application servers 112 can support the construction of pages (e.g., dynamic pages), implement services, business logic, etc. The database server 114 is an information handling system that maintains a central object store 116.

In general, the central object store 116 is operable to store, as objects, stateful information for all user sessions being serviced by the backend computing system 108 at a given time. The objects of the central object store are typically accessible by a lookup key. In certain embodiments, the central object store 116 does not, however, serve as central session storage. This is because, in these embodiments, the central object store 116 does not identify the objects with any particular session. Rather, each object can be accessed by a session-independent lookup key, such as a sequence number, that does not identify a user session.

In operation, the web servers 110 are operable to receive requests (e.g., HTTP requests) from the client device 102 over the network 106. The requests can be made, for example, via the access application 104. The web servers 110 interact with the application servers 112 to service the requests and generate responses (e.g., HTTP responses), for example, in the form of webpages. In a typical embodiment, each request is dispatched to a particular application server of the application servers 112. As requests are serviced, stateful information related to user sessions is typically generated and stored as objects in the central object store 116. The stateful information can include, for example, items in a shopping cart, a purchase order, and/or any other information related to activity during a user session. As described in greater detail with respect to FIGS. 2-3, the central object store 116 can be used to share stateful information among the application servers 112 regardless of which application server of the application servers 112 services a given request.

Figure 2:
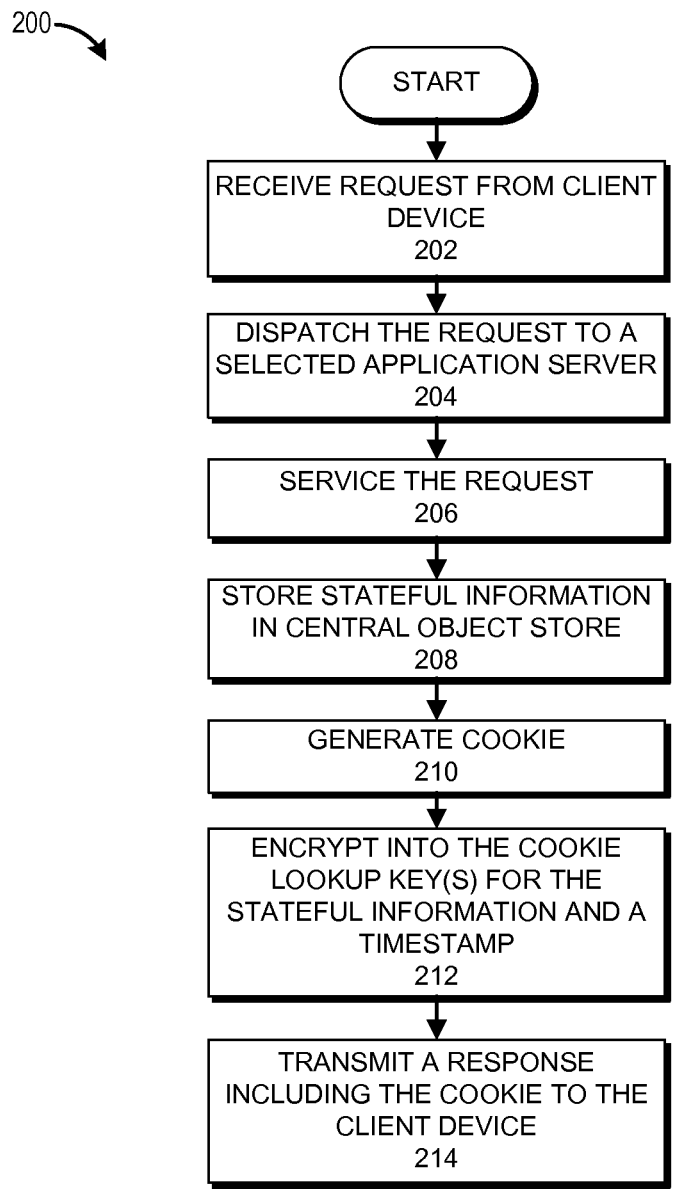
FIG. 2 illustrates an example of a process for beginning a user session and storing stateful information.

FIG. 2 presents a flowchart of an example of a process 200 for beginning a user session and storing stateful information. The process 200 can be implemented by any system that can receive or process data. For example, the process 200, in whole or in part, can be implemented by one or more of the client device 102, the access application 104, the web servers 110, the application servers 112, the database server 114, and the central object store 116. In some cases, the process 200 can be performed generally by the backend computing system 108. Although any number of systems, in whole or in part, can implement the process 200, to simplify discussion, the process 200 will be described in relation to specific systems or subsystems of the system 100.

At block 202, the web servers 110 receive a request (e.g., an HTTP request) from the client device 102. In a typical embodiment, the request is made via the access application 104 which can be, for example, a web browser. At block 204, the web servers 110 dispatch the request to a selected application server of the application servers 112. In various embodiments, the request can be dispatched in accordance with a load-balancing or partitioning scheme. At block 206, the selected application server services the request, for example, by performing a requested service or action, generating requested data, and/or the like.

At block 208, the selected application server stores stateful information for the user session as one or more objects in the central object store 116. The stateful information can include, for example, data provided in the request from the client device 102, data generated by the selected application server, and/or any other data that it is desirable to persist for at least a duration of the user session. By virtue of storage in the central object store 116, each of the one or more objects is typically given a lookup key. As a result, the stateful information can be accessed via the one or more lookup keys.

At block 210, the selected application server generates a cookie. The cookie can be, for example, a session cookie. At block 212, the selected application server encrypts into the cookie the one or more lookup keys for the stateful information. For the encryption, the selected application server can use, for example, an encryption scheme that is common across all of the application servers 112. In some cases, all of the application servers 112 may use a common security key (e.g., a symmetric key). In that way, the one or more lookup keys are typically operable to be decrypted from the cookie by any of the application servers 112. In many cases, the block 210 further includes encrypting a timestamp with a session expire time within the cookie.

At block 214, the web servers 110 transmit a response, such as a web page, to the client device 102 for viewing, for example, via the access application 104. The response typically includes the cookie. In a typical embodiment, the cookie is stored in the access application 104 during the user session (e.g., during a length of time that a user is browsing a given website). At a conclusion of the process 200, the stateful information for the user session is stored in the central object store 116 for ready access in the event of subsequent requests from the user. An example of how subsequent requests from the client device 102 can be handled will be described with respect to FIG. 3.

Figure 3:
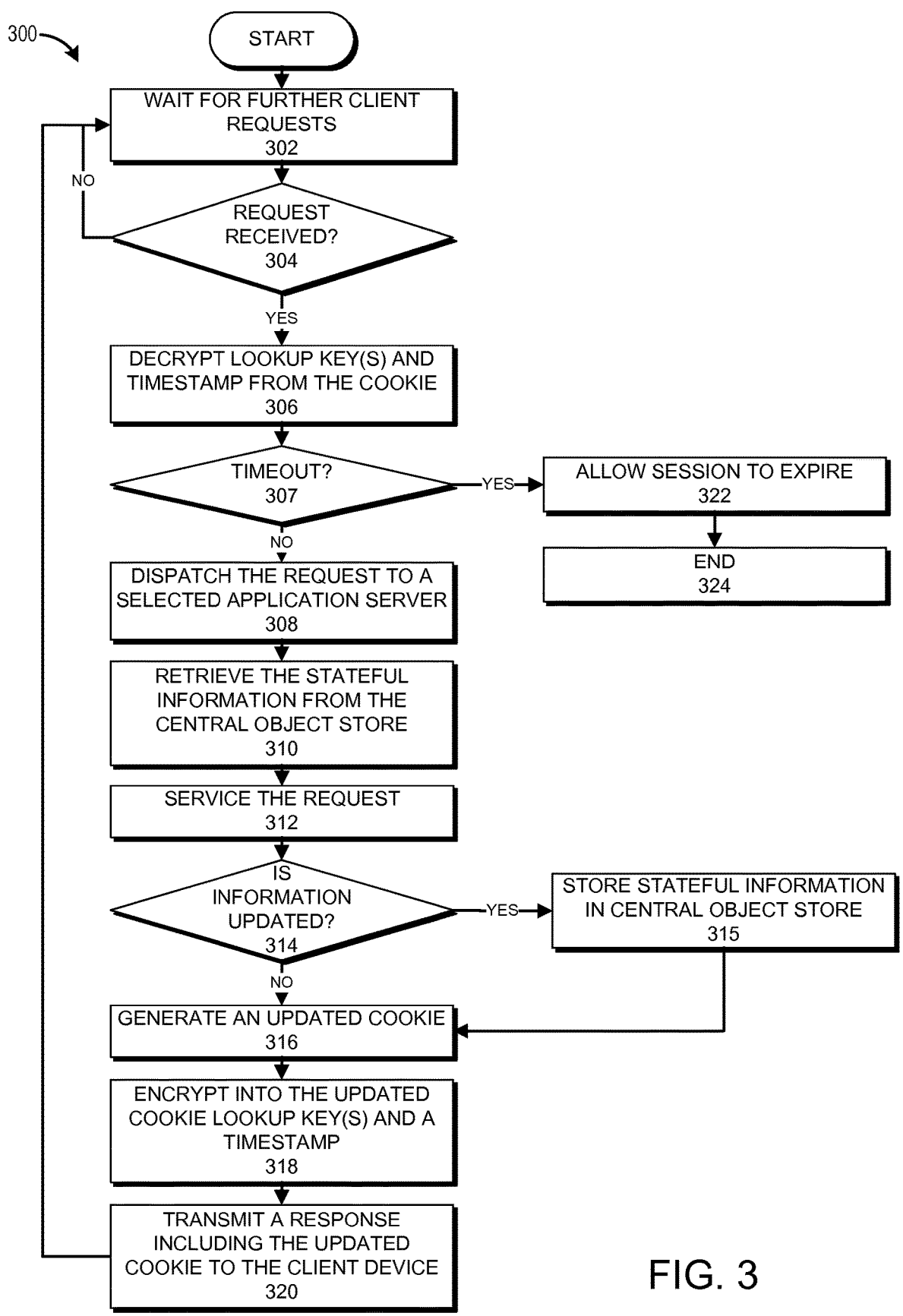
FIG. 3 illustrates an example of a process for handling subsequent requests after a user session has begun.

FIG. 3 presents a flowchart of an example of a process 300 for handling subsequent requests after a user session has begun. In a typical embodiment, the process 300 is performed after, for example, the process 200 of FIG. 2. The process 300 can be implemented by any system that can receive or process data. For example, the process 300, in whole or in part, can be implemented by one or more of the client device 102, the access application 104, the web servers 110, the application servers 112, the database server 114, and the central object store 116. In some cases, the process 300 can be performed generally by the backend computing system 108. Although any number of systems, in whole or in part, can implement the process 300, to simplify discussion, the process 300 will be described in relation to specific systems or subsystems of the system 100.

At block 302, the backend computing system 108 waits for further requests from the client device 102. At decision block 304, it is determined whether any further request has been received. If not, the process 300 returns to the block 302 to continue waiting for further requests from the client device 102. If it is determined at the decision block 304 that a request from the client device 102 has been received, the process 300 proceeds to block 306. In accordance with HTTP protocol, the request typically includes a cookie such as, for example, the cookie generated and transmitted during the process 200 of FIG. 2.

At block 306, the backend computing system 108 decrypts one or more lookup keys and a timestamp from the cookie that is included with the request. As described with respect to the block 212 of FIG. 2, each application server of the application servers 112 typically utilizes a common encryption/decryption scheme and, in some cases, a common security key. Therefore, the backend computing system 108 is generally able to use the knowledge of the encryption/decryption scheme (e.g. a common security key) to decrypt the one or more lookup keys.

At decision block 307, it is determined whether the user session has timed out, for example, as a result of a certain period of time passing with no further requests from the client device 102. The determination at the decision block 307 can be based, at least in part, on the timestamp decrypted from the cookie. If it is determined at the decision block 307 that the user session has timed out, the process 300 proceeds to block 322. At the block 322, the user session is allowed to expire. At block 324, the process 300 ends. If it is determined at the decision block 307 that the user session has not timed out, the process 300 proceeds to block 308.

At block 308, the web servers 110 dispatch the request to a selected application server as described with respect to the block 204 of FIG. 2. As part of the dispatch, the selected application server can be supplied the one or more lookup keys. It should be appreciated that the selected application server at the block 308 need not be the same as the selected application server at the block 204 of FIG. 2. Moreover, each iteration of the block 308 can result in a different application server being selected. As described in greater detail below, the central object store 116 persists the stateful information for at least a duration of the user session. In a typical embodiment, the stateful information can be shared and accessed by any of the application servers 112 using lookup keys that are encrypted and stored in a client-side cookie. As described above with respect to FIG. 2, the client-side cookie can be generated in response to an initial request from the client device 102 (which begins a user session) and provided to the client device 102 in response to the initial request. Subsequent requests from the client device 102 during the user session can include the client-side cookie and, as described below, be used to access objects of the central object store 116.

At block 310, the selected application server retrieves the stateful information for the user session from the central object store 116. In a typical embodiment, the block 310 includes using the one or more lookup keys to retrieve each object referenced thereby. At block 312, the selected application server services the request, potentially utilizing the retrieved stateful information. The block 312 can generally include any of the functionality described above with respect to the block 206 of FIG. 2.

At decision block 314, the selected application server determines whether stateful information should be updated, for example, as a result of the block 312. If not, the process 300 proceeds to block 316. Otherwise, if it is determined at the decision block 314 that the stateful information should be updated, the process 300 proceeds to block 315. At block 315, the application stores stateful information in the central object store. The block 315 can include updating the retrieved stateful information, generating new stateful information, and/or the like. In various embodiments, the block 315 can result in additional objects and, correspondingly, additional lookup keys.

At block 316, the selected application generates an updated cookie. In some cases, the updated cookie can be a same cookie that was received with the request. In other cases, the updated cookie can be a separate, new cookie. At block 318, the selected application server encrypts into the updated cookie each lookup key utilized for the user session and a timestamp. The block 318 can include encrypting, for example, any additional lookup keys resulting from the block 315. In many cases, the block 316 can be omitted if, for example, no additional lookup keys resulted from the block 315 and the one or more lookup keys do not need to be re-encrypted. At block 320, the web servers 110 transmit a response, such as a web page, to the client device 102. The request generally includes the updated cookie. From block 320, the process 300 returns to the block 302 in preparation for another request from the client device 102. The process 300 typically iterates for a duration of the user session.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a computer system comprising a web server and a set of application servers:
    receiving, at the web server, a hypertext transfer protocol (HTTP) request from a client device, the HTTP request initiating a user session;
    the web server dispatching the HTTP request to a first selected application server of the set of application servers based, at least in part, on a load-balancing scheme;
    the first selected application server servicing the request;
    responsive to the servicing, the first selected application server storing stateful information for the user session as at least one object in a central object store that is shared across the set of application servers, wherein each of the at least one object is accessible via a lookup key;
    the first selected application server generating a cookie;
    the first selected application server encrypting into the cookie each lookup key for the at least one object;
    the web server transmitting a response to the client device, the response comprising the cookie;
    the web server receiving a subsequent request in relation to the user session from the client device, the subsequent request comprising the cookie;
    the web server dispatching the subsequent request to a second selected application server of the set of application servers based, at least in part, on the load-balancing scheme, wherein the second selected application server is different from the first selected application server, wherein each lookup key for the at least one object is decrypted from the cookie; and
    using each decrypted lookup key, the second selected application server retrieving the stateful information from the central object store.

2. The method of claim 1, comprising:
    the second selected application server servicing the subsequent request;
    the second selected application server storing additional stateful information for the user session in the central object store;
    the second selected application server generating an updated cookie;
    the second selected application server encrypting into the updated cookie one or more lookup keys for the additional stateful information; and
    the web server transmitting a second response to the client device, the second response comprising the updated cookie.

3. The method of claim 1, wherein each lookup key of the at least one lookup key comprises a session-independent lookup key that identifies a particular object of the central object store.

4. The method of claim 3, wherein the at least one lookup key comprises a plurality of session-independent lookup keys, each session-independent lookup key identifying a particular object of the central object store.

5. The method of claim 1, wherein the encrypting comprises utilizing a security key that is common across the set of application servers.

6. The method of claim 1, comprising performing the method for each of a plurality of client devices.

7. An information handling system comprising a web server and a set of application servers, wherein the web server in combination with the set of application servers are operable to implement a method comprising:
    receiving, at the web server, a hypertext transfer protocol (HTTP) request from a client device, the HTTP request initiating a user session;
    the web server dispatching the HTTP request to a first selected application server of the set of application servers based, at least in part, on a load-balancing scheme;
    the first selected application server servicing the request;
    responsive to the servicing, the first selected application server storing stateful information for the user session as at least one object in a central object store that is shared across the set of application servers, wherein each of the at least one object is accessible via a lookup key;
    the first selected application server generating a cookie;
    the first selected application server encrypting into the cookie each lookup key for the at least one object;
    the web server transmitting a response to the client device, the response comprising the cookie;
    the web server receiving a subsequent request in relation to the user session from the client device, the subsequent request comprising the cookie;
    the web server dispatching the subsequent request to a second selected application server of the set of application servers based, at least in part, on the load-balancing scheme, wherein the second selected application server is different from the first selected application server, wherein each lookup key for the at least one object is decrypted from the cookie; and
    using each decrypted lookup key, the second selected application server retrieving the stateful information from the central object store.

8. The information handling system of claim 7, wherein the method comprises:
    the second selected application server servicing the subsequent request;
    the second selected application server storing additional stateful information for the user session in the central object store;
    the second selected application server generating an updated cookie;
    the second selected application server encrypting into the updated cookie one or more lookup keys for the additional stateful information; and the web server transmitting a second response to the client device, the second response comprising the updated cookie.

9. The information handling system of claim 7, wherein each lookup key of the at least one lookup key comprises a session-independent lookup key that identifies a particular object of the central object store.

10. The information handling system of claim 9, wherein the at least one lookup key comprises a plurality of session-independent lookup keys, each session-independent lookup key identifying a particular object of the central object store.

11. The information handling system of claim 7, wherein the encrypting comprises utilizing a security key that is common across the set of application servers.

12. The information handling system of claim 7, the method comprising performing the method for each of a plurality of client devices.

13. A computer-program product comprising a non-transitory computer-usable medium having computer-readable program code embodied therein, the computer-readable program code adapted to be executed to implement a method comprising:
  receiving, at a web server, a hypertext transfer protocol (HTTP) request from a client device, the HTTP request initiating a user session;
  the web server dispatching the HTTP request to a first selected application server of a set of application servers based, at least in part, on a load-balancing scheme;
  the first selected application server servicing the request;
  responsive to the servicing, the first selected application server storing stateful information for the user session as at least one object in a central object store that is shared across the set of application servers, wherein each of the at least one object is accessible via a lookup key;
  the first selected application server generating a cookie;
  the first selected application server encrypting into the cookie each lookup key for the at least one object;
  the web server transmitting a response to the client device, the response comprising the cookie;
  the web server receiving a subsequent request in relation to the user session from the client device, the subsequent request comprising the cookie;
  the web server dispatching the subsequent request to a second selected application server of the set of application servers based, at least in part, on the load-balancing scheme, wherein the second selected application server is different from the first selected application server, wherein each lookup key for the at least one object is decrypted from the cookie; and
  using each decrypted lookup key, the second selected application server retrieving the stateful information from the central object store.

14. The computer-program product of claim 13, wherein the method comprises:
  the second selected application server servicing the subsequent request;
  the second selected application server storing additional stateful information for the user session in the central object store;
  the second selected application server generating an updated cookie;
  the second selected application server encrypting into the updated cookie one or more lookup keys for the additional stateful information; and
  the web server transmitting a second response to the client device, the second response comprising the updated cookie.

15. The computer-program product of claim 13, wherein each lookup key of the at least one lookup key comprises a session-independent lookup key that identifies a particular object of the central object store.

16. The computer-program product of claim 15, wherein the at least one lookup key comprises a plurality of session-independent lookup keys, each session-independent lookup key identifying a particular object of the central object store.

17. The computer-program product of claim 13, wherein the encrypting comprises utilizing a security key that is common across the set of application servers.

* * * * *